US008483150B2

(12) United States Patent
Chun et al.

(10) Patent No.: US 8,483,150 B2
(45) Date of Patent: Jul. 9, 2013

(54) METHOD AND APPARATUS OF TRANSMITTING UPLINK CONTROL SIGNAL IN WIRELESS COMMUNICATION SYSTEM

(75) Inventors: Jin Young Chun, Anyang-si (KR); Sunam Kim, Anyang-si (KR); Suk Woo Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 12/656,614

(22) Filed: Feb. 4, 2010

(65) Prior Publication Data

US 2010/0202373 A1    Aug. 12, 2010

Related U.S. Application Data

(60) Provisional application No. 61/150,306, filed on Feb. 5, 2009, provisional application No. 61/170,087, filed on Apr. 16, 2009.

(30) Foreign Application Priority Data

Jul. 23, 2009   (KR) ........................ 10-2009-0067488

(51) Int. Cl.
*H04W 72/04*      (2009.01)
(52) U.S. Cl.
USPC ........................................................ 370/329
(58) Field of Classification Search
USPC .......................................... 370/329, 343, 335
See application file for complete search history.

(56) References Cited

U.S. PATENT DOCUMENTS

| 7,873,005 | B2 * | 1/2011 | Ahn et al. ...................... 370/329 |
| 2003/0060163 | A1 | 3/2003 | Filkins et al. |
| 2004/0097189 | A1 | 5/2004 | Bongfeldt et al. |
| 2004/0162037 | A1 | 8/2004 | Shpak |
| 2008/0232312 | A1 * | 9/2008 | Roh et al. ....................... 370/329 |
| 2009/0081955 | A1 * | 3/2009 | Necker ......................... 455/63.1 |
| 2009/0181712 | A1 * | 7/2009 | Xu .................................. 455/522 |
| 2009/0232095 | A1 | 9/2009 | Ahn et al. |
| 2010/0008317 | A1 * | 1/2010 | Bhattad et al. ................. 370/329 |
| 2010/0142363 | A1 * | 6/2010 | Lee et al. ....................... 370/203 |

FOREIGN PATENT DOCUMENTS

| JP | 2007-195184 | 8/2007 |
| JP | 2007-209031 | 8/2007 |
| JP | 2008-236018 | 10/2008 |
| JP | 2009-021791 | 1/2009 |
| JP | 2010-512066 | 4/2010 |
| WO | WO 2006/070466 | 7/2006 |
| WO | WO 2009/008677 | 1/2009 |

* cited by examiner

*Primary Examiner* — Mark Rinehart
*Assistant Examiner* — Mohammad Anwar
(74) *Attorney, Agent, or Firm* — McKenna Long & Aldridge LLP

(57) ABSTRACT

A method and apparatus of transmitting an uplink control signal in a wireless communication system is provided. A user equipment receives pieces of resource allocation information about a plurality of respective uplink control channels, and transmits the uplink control signal through one of the plurality of uplink control channels. Radio resources sequentially adjacent to each other on a basis of one reference uplink control channel, selected from the plurality of uplink control channels, are allocated to the respective uplink control channels. And the resource allocation information comprises size of the radio resources allocated to each of the plurality of uplink control channels within a resource region in which the plurality of uplink control channels is configured.

18 Claims, 17 Drawing Sheets

METHOD AND APPARATUS OF TRANSMITTING UPLINK CONTROL SIGNAL IN WIRELESS COMMUNICATION SYSTEM

CROSS-REFERENCE TO RELATED APPLICATIONS

This application claims the benefit of priority of U.S. Provisional application No. 61/150,306 filed on Feb. 5, 2009, U.S. Provisional application No. 61/170,087 filed on Apr. 16, 2009, and Korean Patent Application No. 10-2009-0067488 filed on Jul. 23, 2009, all of which are incorporated by reference in their entirety herein.

BACKGROUND OF THE INVENTION

1. Field of the Invention

The present invention relates to wireless communication, and more particularly, to a method and apparatus of transmitting an uplink control signal in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

One of the systems which are being taken into consideration in the next-generation wireless communication system is an Orthogonal Frequency Division Multiplexing (hereinafter referred to as OFDM) system capable of attenuating an Inter-Symbol Interference (ISI) effect with low complexity. The OFDM system transforms serial input data symbols into N parallel data symbols and transmits the N data symbols on respective N subcarriers. The N subcarriers maintain orthogonality in the frequency domain. The orthogonal channels experience independent frequency selective fading, and the interval between transmitted symbols is lengthened, thereby being capable of minimizing the ISI effect. Orthogonal Frequency Division Multiple Access (hereinafter referred to as OFDMA) refers to a multi-access method of realizing multi-access by independently providing users with some of available subcarriers in a system using OFDM as a modulation method. In the OFDMA method, frequency resources called subcarriers are provided to each user and are independently provided to a number of the users. Accordingly, the frequency resources provided to a number of the users, in general, do not overlap with each other. Consequently, the frequency resources are exclusively allocated to the respective users.

In the OFDMA system, the frequency diversity for a number of users can be obtained through frequency selective scheduling, and subcarriers can be allocated in various manners according to a permutation method for the subcarriers. Further, the efficiency of a space domain can be increased through a space multiplexing scheme using multiple antennas. To support the various schemes, a control signal must be transmitted between a mobile station and a base station. The control signal includes a Channel Quality Indicator (CQI) which is indicative of a channel state and transmitted from a mobile station to a base station, acknowledgement (ACK)/not-acknowledgement (NACK) signals (that is, responses to data transmission), a bandwidth request signal requesting the allocation of radio resources, precoding information in a multi-antenna system, antenna information, and so on. The control signal is transmitted through a control channel.

A method of allocating an uplink control channel has not yet been disclosed in detail. Accordingly, it is necessary to determine a Fractional Frequency Reuse (FFR) region in which uplink control channels exist, the sequence of an uplink control channel and an uplink data channel, etc.

SUMMARY OF THE INVENTION

It is, therefore, an object of the present invention to provide a method and apparatus of transmitting an uplink control signal in a wireless communication system.

In an aspect, a method of transmitting an uplink control signal in a wireless communication system is provided. The method include receiving pieces of resource allocation information about a plurality of respective uplink control channels, and transmitting the uplink control signal through one of the plurality of uplink control channels, wherein radio resources sequentially adjacent to each other on a basis of one reference uplink control channel, selected from the plurality of uplink control channels, are allocated to the respective uplink control channels, and the resource allocation information comprises size of the radio resources allocated to each of the plurality of uplink control channels within a resource region in which the plurality of uplink control channels is configured. The resource allocation information may further include information about a position of a subframe in which the resource region is transmitted. The resource allocation information may further include information about a frequency partition (FP) in which the plurality of uplink control channels are allocated. The resource allocation information may be broadcast. The plurality of uplink control channels may include at least one of a Bandwidth Request Channel (BRCH) and a feedback channel. The feedback channel may include a fast feedback channel (FFBCH) and a HARQ feedback channel (HFBCH). The radio resources may be allocated sequentially in order of the radio resources for the feedback channel and the radio resources for the BRCH. The size of the radio resources may include the number of resource units to which the BRCHs or the feedback channels included in the plurality of uplink control channels are allocated or the number of BRCHs or feedback channels. The resource unit of the BRCH may include six OFDM symbols in time domain and six subcarriers in frequency domain. The resource unit of the feedback channel may include 2 OFDM symbols in time domain and 2 subcarriers in frequency domain if the feedback channel comprises HARQ Feedback channel (HFBCH). The resource unit of the feedback channel may include 6 OFDM symbols in time domain and 2 subcarriers in frequency domain if the feedback channel comprises Fast Feedback channel (FFBCH). A position within the resource region of the reference uplink control channel may be predetermined.

In another aspect, a user equipment (UE) in a wireless communication system is provided. The UE include a radio frequency (RF) Unit configured to transmit or receive a radio signal, and a processor coupled to the RF unit and configured to receive pieces of resource allocation information about a plurality of respective uplink control channels, and transmits the uplink control signal through one of the plurality of uplink control channels, wherein radio resources sequentially adjacent to each other on a basis of one reference uplink control channel, selected from the plurality of uplink control channels, are allocated to the respective uplink control channels, and the resource allocation information comprises size of the radio resources allocated to each of the plurality of uplink control channels within a resource region in which the plurality of uplink control channels is configured. The resource allocation information may further include information about a position of a subframe in which the resource region is transmitted. The plurality of uplink control channels may include at least one of a Bandwidth Request Channel (BRCH) and a feedback channel.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
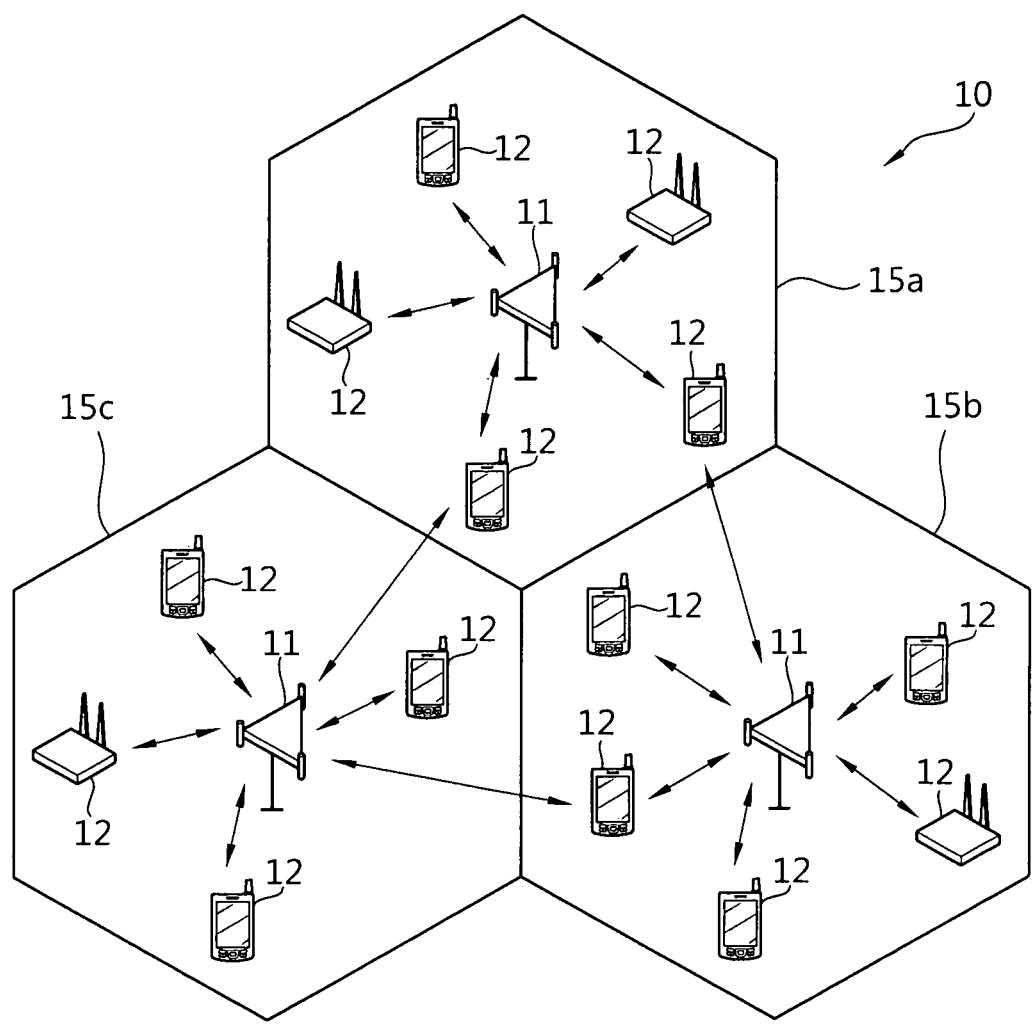
FIG. 1 is a diagram showing a wireless communication system.

FIG. 1 shows a wireless communication system.

The wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
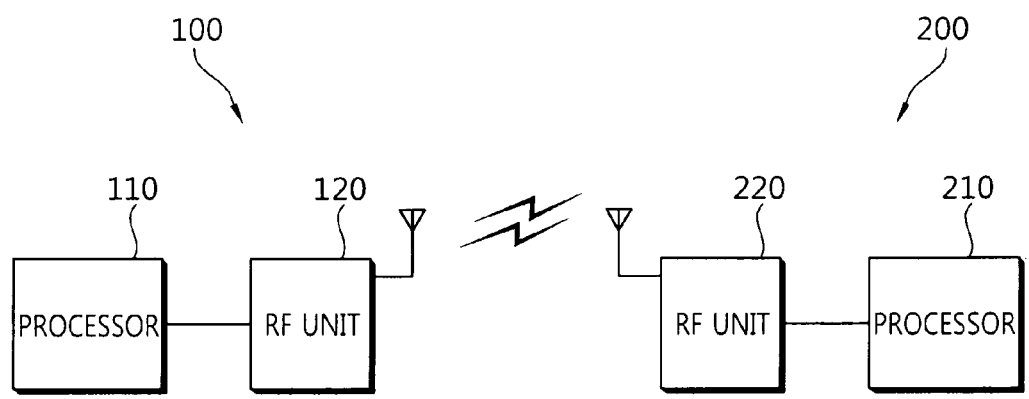
FIG. 2 is a block diagram of a transmitter and a receiver according to an embodiment of the present invention.

FIG. 2 is a block diagram of a transmitter and a receiver according to an embodiment of the present invention.

Referring to FIG. 2, the transmitter 100 includes a processor 110 and a Radio Frequency (RF) unit 120. The processor 110 is configured to process channel information about the size, an index, etc. of an uplink control channel to be allocated and to allocate the uplink control channel. The RF unit 120 transmits the channel information.

The receiver 200 includes a processor 210 and an RF unit 220. The processor 210 generates an uplink control signal by processing the channel information, and the RF unit 220 transmits the uplink control signal.

Although the transmitter 100 and the receiver 200 are illustrated to have a Single-Input Single-Output (SISO) system having one transmission antenna and one reception antenna, the technical spirit of the present invention can be applied to a Multiple-Input Multiple-Output (MIMO) system having a number of transmission antennas and a number of reception antennas.

Further, although the transmitter 100 and the receiver 200 are illustrated to have an OFDM/OFDMA-based system, the technical spirit of the present invention can be applied to other wireless access method-based systems, such as Time Division Multiple Access (TDMA) and Code Division Multiple Access (CDMA).

Figure 3:
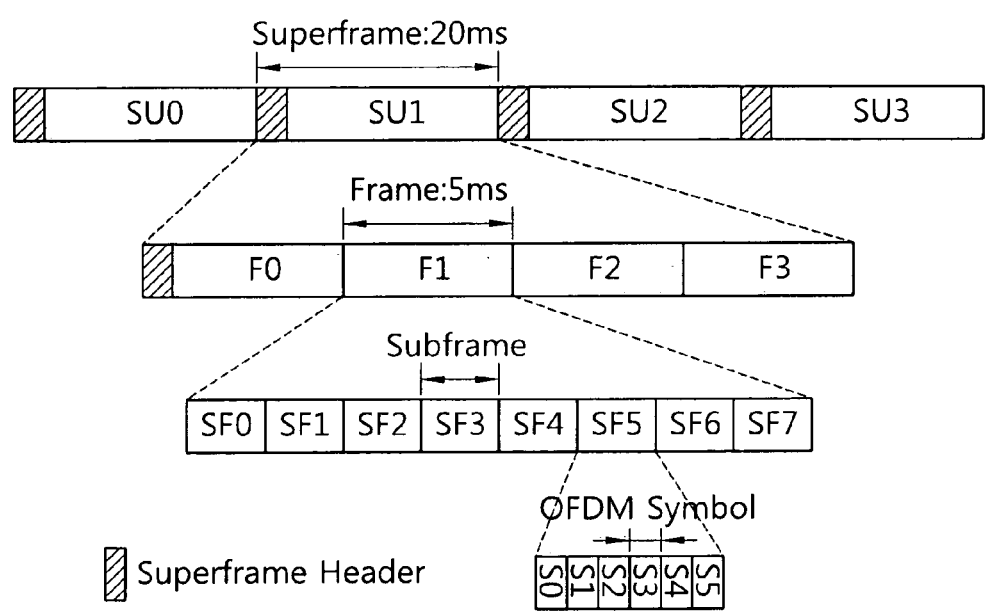
FIG. 3 is a diagram showing an example of a frame structure.

FIG. 3 shows an example of a frame structure.

Referring to FIG. 3, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed resource unit (DRU) may be used to obtain a frequency diversity gain. The DRU includes a distributed subcarrier group in one frequency partition. The DRU has the same size as the PRU. One subcarrier is a basic unit of constituting the DRU. A distributed logical resource unit (DLRU) can be obtained by performing subcarrier permutation on the DRU.

A contiguous resource unit (CRU) may be used to obtain a frequency selective scheduling gain. The CRU includes a localized subcarrier group. The CRU has the same size as the PRU. A contiguous logical resource unit (CLRU) can be obtained by directly mapping the CRU.

Meanwhile, a fractional frequency reuse (FFR) scheme can be used in a cellular system having multiple cells. The FFR scheme divides a full frequency band into a plurality of frequency partitions (FPs), and allocates the FP to each cell. According to the FFR scheme, different FPs can be allocated between neighbor cells, and the same FP can be allocated between cells separated far from each another. Or, every FP may be allocated to each cell, and each cell may use every FP except the FP which occur inter-cell interference (ICI) between neighbor cells. Therefore, ICI can be reduced, and performance of a user equipment located in a cell edge can be increased.

A control channel for transmitting a control signal or a feedback signal is described below. The control channel can be used to transmit various kinds of control signals for communication between a base station and a mobile station. The control channel described hereinafter can include an uplink control channel, a downlink control channel, and a fast feedback channel.

Figure 4:
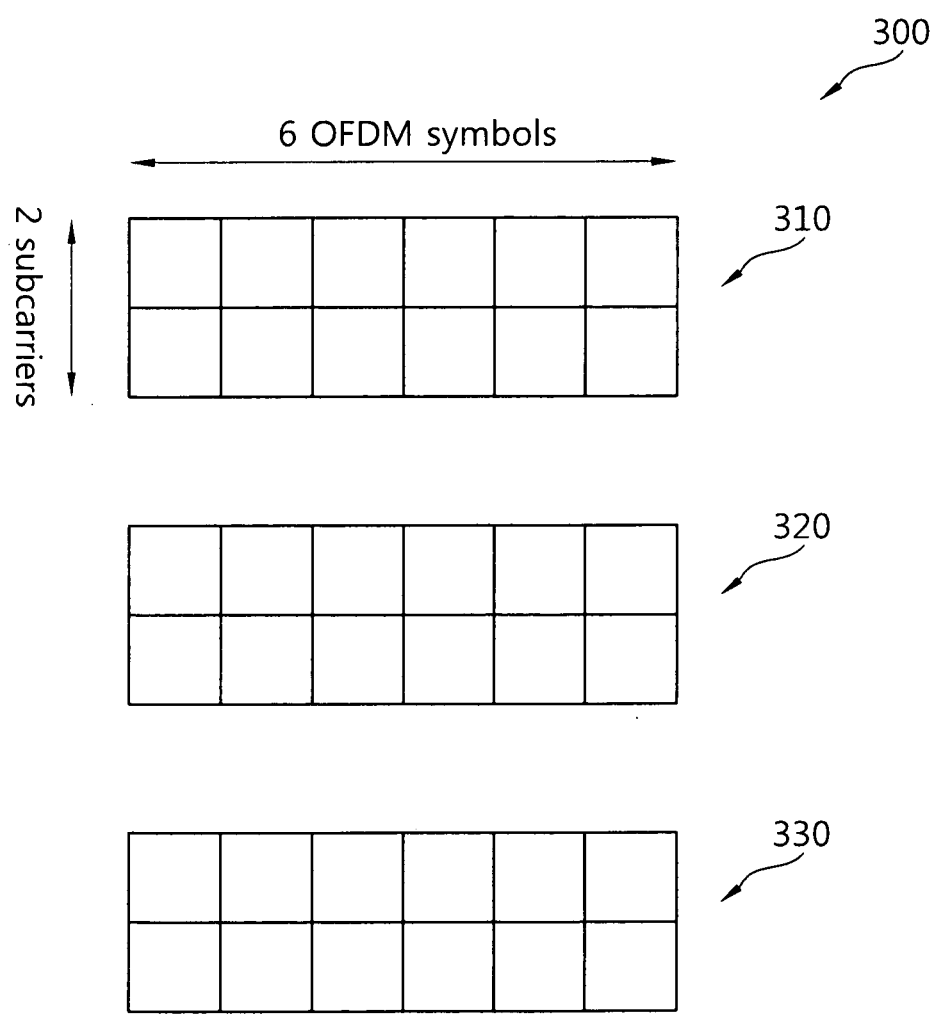
FIG. 4 is a diagram showing an example of a resource unit used for an uplink control channel in an IEEE 802.16m system.

FIG. 4 shows an example of a resource unit used for an uplink control channel in an IEEE 802.16m system. A resource unit 100 is a resource allocation unit used for transmission of an uplink control channel, and is also referred to as a tile. The tile 100 may be a physical resource allocation unit or a logical resource allocation unit. The control channel includes at least one tile 100, and the tile 100 consists of at least one frequency-domain subcarrier over at least one time-domain OFDM symbol. The tile 100 denotes an aggregation of a plurality of subcarriers contiguous along a time domain and a frequency domain. The tile 100 includes a plurality of data subcarriers and/or pilot subcarriers. A sequence of a control signal may be mapped to the data subcarrier, and a pilot for channel estimation may be mapped to the pilot subcarrier.

The tile 100 includes three mini units 110, 120, and 130. The mini unit is also referred to as a mini tile. The tile 100 may consist of a plurality of mini tiles. The mini tile may consist of at least one frequency-domain subcarrier over at least one time-domain OFDM symbol. Each of the mini tiles 110, 120, and 130 includes two contiguous subcarriers throughout 6 OFDM symbols. The mini tiles 110, 120, and 130 included in the tile 100 may not be contiguous to one another in the frequency domain. This implies that at least one mini tile of another tile may be located between the $1^{st}$ mini tile 110 and the $2^{nd}$ mini tile 120 and/or between the $2^{nd}$ mini tile 120 and the $3^{rd}$ mini tile 130. Frequency diversity can be obtained by locating the mini tiles 110, 120, and 130 included in the tile 100 in a distributive manner.

The number of time-domain OFDM symbols and/or the number of frequency-domain subcarriers included in the mini tile are for exemplary purposes only, and thus the present invention is not limited thereto. The mini tile may include a plurality of subcarriers throughout a plurality of OFDM symbols. The number of OFDM symbols included in the mini tile may differ according to the number of OFDM symbols included in a subframe. For example, if the number of OFDM symbols included in one subframe is 6, the number of OFDM symbols included in a mini tile may be 6.

The OFDM symbol denotes a duration in the time domain, and is not necessarily limited to an OFDM/OFDMA-based system. The OFDM symbol may also referred to as other terms such as a symbol duration. Technical features of the present invention are not limited to a specific multiple access scheme by the term of the OFDM symbol. In addition, the subcarrier denotes an allocation unit in the frequency domain. Although one subcarrier is used for this unit herein, a subcarrier set unit may be used.

A control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

Of the control channels, the uplink control channel can include a Fast Feedback Channel (FFBCH), a Bandwidth Request Channel (BRCH), a HARQ feedback channel (HF-BCH: Hybrid Automatic Repeat reQuest Feedback Channel), UL ranging channel, etc. The FFBCH is a channel for faster uplink data transmission than typical uplink data transmission. The BRCH is a channel requesting radio resources for transmitting uplink data or a control signal which will be transmitted by a mobile station. The HARQ feedback channel is a channel for transmitting ACK/NACK signals in response to data transmission. The FFBCH, the BRCH, the HARQ feedback channel, etc. can be placed anywhere in an uplink subframe or frame. UL ranging channel is used for UL synchronization. The UL ranging channel can be further classified into ranging channel for non-synchronized and synchronized UE. The ranging channel for synchronized UE is used for periodic ranging. The ranging channel for non-synchronized UE is used for initial access and handover.

A method of transmitting an uplink control signal is described below.

In general, in allocating an uplink control channel for transmitting an uplink control signal, whether to allocate the uplink control channel to each FFR region can be determined. If the uplink control channels are allocated to all the FFR regions, signaling overhead can occur when they are allocated. Further, a FFR partitioning method in the downlink can differ from a FFR partitioning method in the uplink. In this case, confusion can occur in allocating the uplink control channels. Accordingly, a base station can determine an FFR region to which uplink control channels are allocated based on broadcast information, such as the size of an uplink control channel. For example, the number of channels as many as they can be allocated to all FFR regions is not necessary, and a BRCH not allowing power control can be allocated to only one FFR region. Furthermore, an FFBCH, an HFBCH, and so on which allow power control can be allocated to all FFR regions or can be allocated on a region basis.

Figure 5:
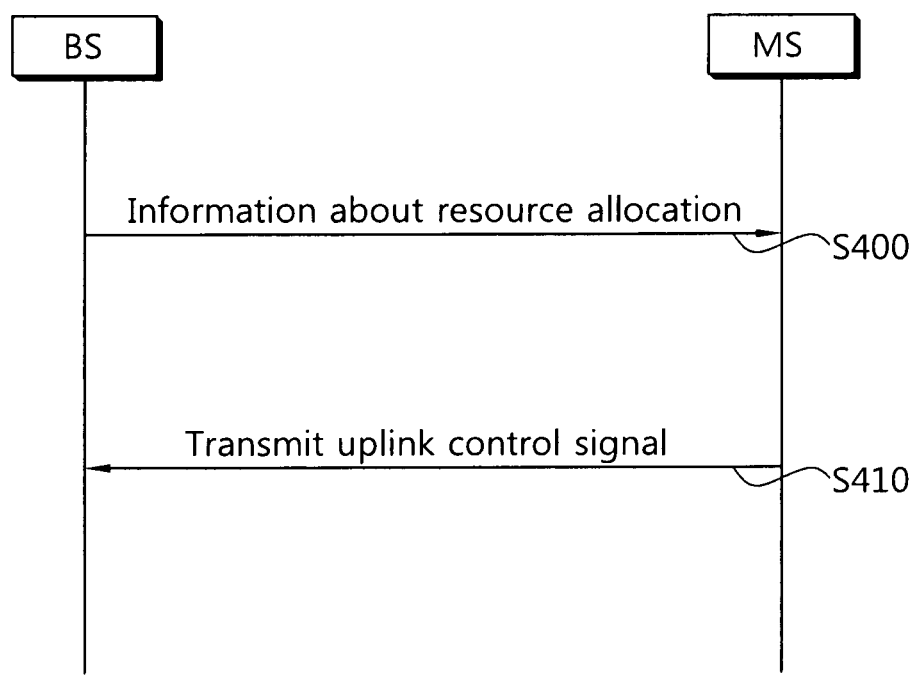
FIG. 5 is a diagram illustrating a method of transmitting an uplink control signal according to an embodiment of the present invention.

FIG. 5 is a diagram illustrating a method of transmitting an uplink control signal according to an embodiment of the present invention.

Referring to FIG. 5, a base station (BS) transmits pieces of resource allocation information about a plurality of respective uplink control channels to a User Equipment (UE) in step S400. The plurality of uplink control channel may be one of BRCH, Enhanced Multicast Broadcast Service (EMBS) feedback channel or feedback channel. The resource allocation information may comprises size of the radio resources allocated to each of the plurality of uplink control channels within a resource region in which the plurality of uplink control channels is configured. The resource allocation information may further comprises information about a position of a subframe in which the resource region is transmitted. The size of the radio resources may be a size of the corresponding uplink control channel, or may be the number of uplink control channel which is the same kind of the corresponding uplink control channel. For example, if the number of BRCH is three (i.e, BRCH #0, BRCH #1, BRCH #2), the size of the radio resources may be a size of one BRCH or a size of three BRCH. In addition, the resource allocation information may determine frequency partition in which the UL control channel is allocated if FFR scheme is used. For example, the UL control channel may be allocated in reuse 1 region. In this case, the reuse 1 region may be $1^{St}$ FP(FP0). Or, the UL control channel may be allocated in highest-power reuse 3 region. In the case, the reuse 3 region may be one of $2^{nd}$ FP(FP1), $3^{rd}$ FP(FP2) and $4^{th}$ FP(FP3). The resource allocation information may be broadcast, and may be included in S-SFH.

The size of the radio resources allocated to each of the plurality of uplink control channels may be transmitted as broadcast information. Broadcast information is information that all UE need to know (non-user-specific), and may be transmitted on Broadcast Channel (BCH) or Advanced MAP (A-MAP)=Unicast Service Control Channel (USCCH). Furthermore, information about a position of a subframe in which the resource region is transmitted (i.e. index information of the uplink control channel) may be transmitted as unicast information. Unicast information is user-specific information, and may be transmitted on A-MAP.

According to the resource allocation information transmitted, radio resources sequentially adjacent to each other are allocated to the plurality of respective uplink control channels. The one of the plurality of uplink control channels may be set to a reference uplink control channel, and radio resources sequentially adjacent to each other on a basis of the reference uplink control channel are allocated to the respective uplink control channels. The position of the reference uplink control channel in frequency domain may be predetermined.

The UE transmits the uplink control signal through one of the plurality of uplink control channel to the BS in step S410. If the uplink control signal is a feedback signal, the feedback signal may be transmitted on the position of the subframe in which the resource region is transmitted.

Figure 6:
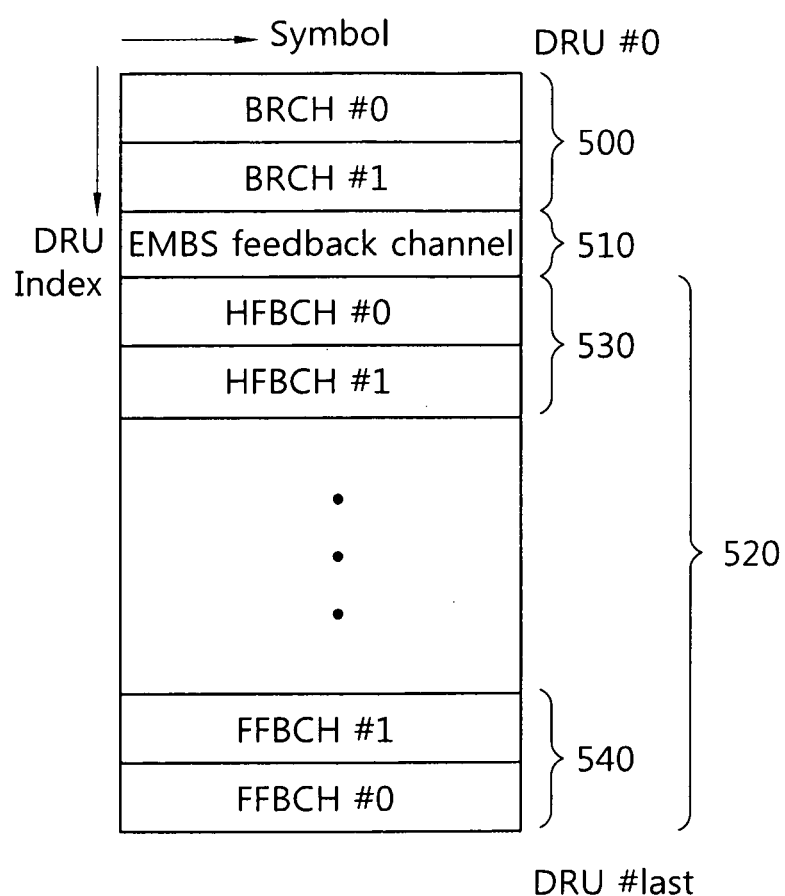
FIG. 6 is a diagram showing an example of uplink control channels allocated according to the present invention.

FIG. 6 is a diagram showing an example of uplink control channels allocated according to the present invention.

Referring to FIG. 6, first, BRCHs 500 are allocated as uplink control channels. The BRCHs 500 are contention-based channels. All mobile stations belonging to a base station need to know a region to which the BRCHs 500 are allocated. The BRCHs 500 can start from a DRU #0. In some embodiments, the BRCHs 500 can be placed not only in the DRU #0, but in a fixed location in the standard document, such as a DRU #last, or right after an Enhanced Multicast Broadcast Service (EMBS) feedback channel. In this case, since a mobile station can estimate the start position of the BRCHs 500, the start position of the BRCHs 500 needs not to be transmitted to the mobile station as broadcast information. To estimate a start position of other neighbor control channels, however, the size of the BRCHs 500 needs to be transmitted as broadcast information.

An EMBS feedback channel 510 is allocated adjacent to the BRCHs 500. The EMBS feedback channel 510 can start at the end position of the BRCHs 500 so that it is adjacent to the BRCHs 500. In other words, if the BRCHs 500 start from the DRU #0, the start position of the EMBS feedback channel 510 is 'the DRU #0+the size of BRCHs'. In some embodiments, the EMBS feedback channel 510 can start at a fixed position in the standard document, such as the DRU #0 or the DRU #last. In this case, since a mobile station can estimate the start position of the EMBS feedback channel 510, the start position of the EMBS feedback channel 510 needs not to be transmitted to the mobile station as broadcast information. To estimate a start position of other neighbor control channels, however, the size of the EMBS feedback channel 510 needs to be transmitted as broadcast information.

Feedback channels 520 are allocated adjacent to the EMBS feedback channel 510. The feedback channels 520 correspond to non-contention-based channels. User equipments need to know the regions of the feedback channels 520 allocated to the respective mobile stations by a base station. All the mobile stations can know the regions to which the feedback channels 520 are allocated in order to allocate data channels or sounding channels. The feedback channels 520 can be classified into two kinds; HFBCHs 530 and FFBCHs 540. The HFBCHs 530 are used to transmit HARQ feedback signals and to transmit ACK/NACK signals in response to received signals. The FFBCHs 540 are allocated for fast uplink transmission, and they can have feedback messages loaded thereon.

The HFBCHs 530 are allocated adjacent to the EMBS feedback channel 510. The HFBCHs 530 can start at the end position of the EMBS feedback channel 510 so that they are adjacent to the EMBS feedback channel 510. In other words, the start position of the HFBCH is 'the DRU #0+the size of the BRCHs+the size of the EMBS feedback channel'. In some embodiments, the HFBCHs 530 can start at a fixed position in the standard document, such as the DRU #0 or the DRU #last. In this case, since a mobile station can estimate the start position of the HFBCHs 530, the start position of the HFBCHs 530 needs not to be transmitted to the mobile station as broadcast information. In the case in which information about the number of downlink (DL) grants is included in an A-MAP, mobile stations that have read the A-AMP can know the size of the HFBCHs 530. Accordingly, the size of the HFBCHs 530 needs not to be transmitted to the mobile stations as broadcast information.

In order for each mobile station to transmit a HARQ feedback signal, a base station can transmit an index (that is, information about the position of an uplink subframe in which the HARQ feedback signal will be transmitted) of the HFBCH 530 to the mobile station as unicast information. In general, since a mobile station that has read an A-MAP can know the index of a downlink grant which has been allocated thereto, a HARQ feedback signal can be transmitted in a set uplink subframe. Accordingly, the index of the HFBCH 530 needs not to be transmitted to the mobile station as unicast information. If a mobile station is unable to know the index of a downlink grant, however, an index of the HFBCH 530 which will be used by the mobile station needs to be transmitted to the mobile station as unicast information. In the case of a Persistent Allocation (PA) HFBCH, a mobile station is unable to know the size or the sequence of a persistent allocation HFBCH other than persistent allocation information although it has read an A-MAP. Accordingly, the index of a persistent allocation HFBCH to be used by each mobile station has to be transmitted to the mobile station as unicast information. The index of the persistent allocation HFBCH can be transmitted with a MAP for the persistent allocation HFBCH newly defined or can be transmitted with it attached to the header of downlink data.

The FFBCHs 540 are allocated starting from the last channel DRU #last of the feedback channels 520. In some embodiments, the FFBCHs 540 can follow the BRCHs 500, the EMBS feedback channel 510, or the HFBCHs 530, or can start at a fixed position in the standard document, such as the DRU #0 or the DRU #last. In this case, since a mobile station can know the start position of the FFBCHs 540, the start position of the FFBCHs 540 needs not to be transmitted to the mobile station as broadcast information. The size of the FFBCHs 540 also needs not to be transmitted to the mobile station as broadcast information.

In order for each mobile station to transmit a fast feedback signal, a base station can transmit an index (that is, information about the position of an uplink subframe in which the fast feedback signal will be transmitted) of the FFBCH 540 to the mobile station as unicast information. Like the persistent allocation HFBCHs 530, the indices of the FFBCHs 540 which will be used by respective mobile station need to be transmitted to the mobile stations as unicast information. A base station can transmit an index of the FFBCH 540 to a mobile station that needs to be allocated with the FFBCH 540. The index of the FFBCH 540 can be transmitted with a MAP for the FFBCH 540 newly defined or can be transmitted with it attached to the header of downlink data.

Size information about an uplink control channel can be allocated every channel size. The size of a BRCH is allocated in the unit of three or six 6×6 tiles which constitute one BRCH. The size of an HFBCH is allocated in the unit of three 2×2 HMTs which constitute one HFBCH. Further, the size of an FFBCH is allocated in the unit of three 2×6 Feedback Mini-Tiles (FMTs) which constitute one FFBCH. In this case, if uplink control channels are allocated so that they are logically adjacent to each other according to the proposed method, a plurality of the uplink control channels can coexist within one DRU. Accordingly, the uplink control channels can be defined separately from uplink data channels.

In some embodiments, the size of uplink control channels can be allocated on the basis of tiles to be used. In this case, if the uplink control channels are allocated so that they are logically adjacent to each other according to the proposed method, a plurality of the uplink control channels can coexist within the tiles of one DRU. Accordingly, the uplink control channels can be defined separately from uplink data channels.

Figure 7:
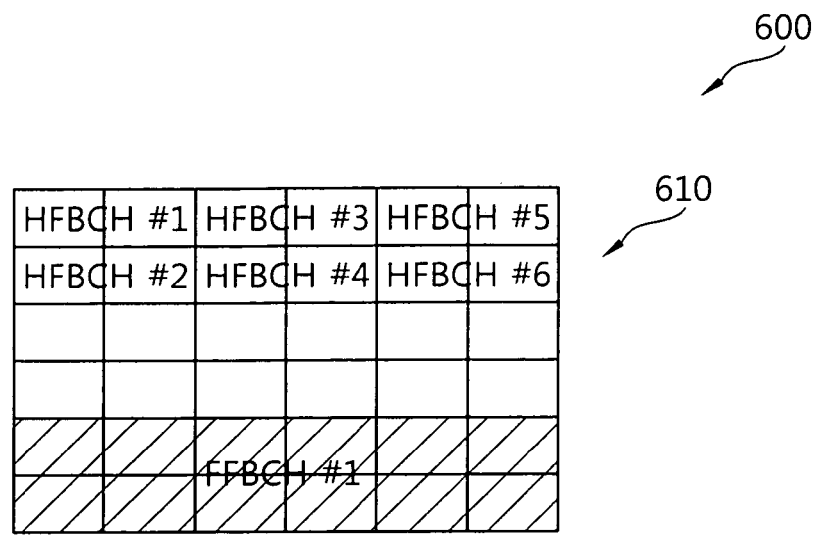
FIG. 7 is a diagram showing an example in which HFBCHs and FFBCHs of allocated uplink control channels are allocated within one DRU.
Figure 7:
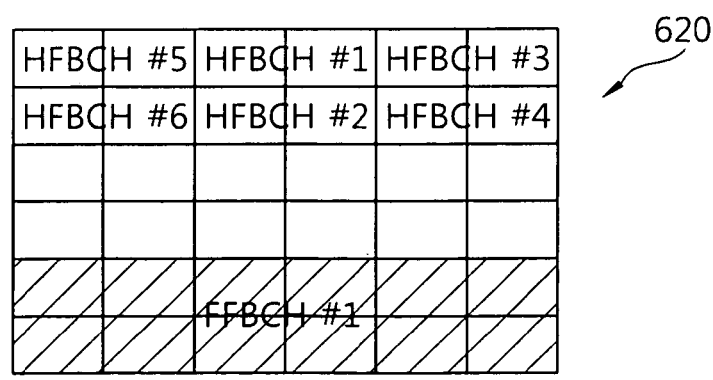
Figure 7:
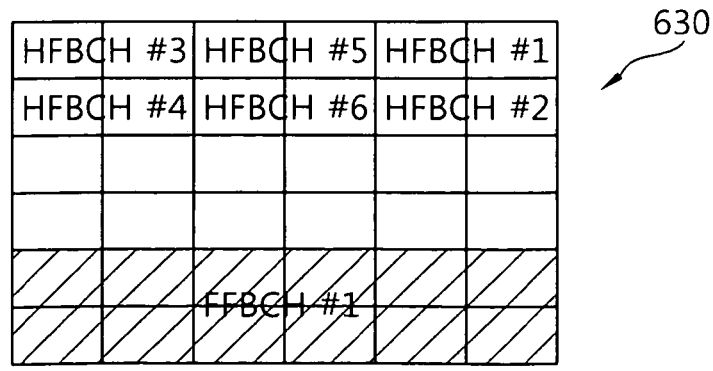

FIG. 7 is a diagram showing an example in which the HFBCHs and the FFBCHs of the allocated uplink control channels are allocated within a single DRU. Referring to FIG. 7, a DRU 600 includes six OFDM symbols and includes three tiles 610, 620, and 630 each having a 6×6 size. The resources of the HFBCHs exist in three distributed 2×6-sized Feedback Mini-Tiles (FMTs). Each of the FMTs can be classified into 2×2-sized HARQ Mini-Tiles (HMTs). The three FMTs support six HFBCHs. The resources of the FFBCHs exist in three distributed 2×6-sized FMTs, and the three FMTs support one HFBCH.

Figure 8:
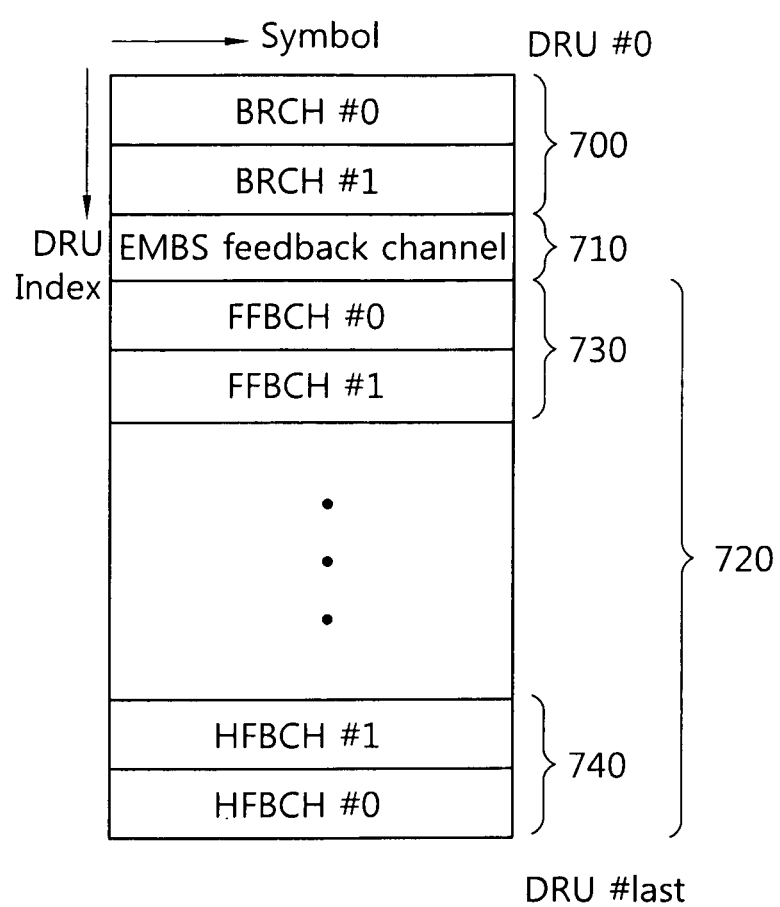
FIG. 8 is a diagram showing another example of uplink control channels allocated according to the present invention.

FIG. 8 is a diagram showing another example of uplink control channels allocated according to the present invention. In FIG. 8, BRCHs 700 start from a DRU #0, and an EMBS feedback channel 710 starts from 'the DRU #0+the size of the BRCHs'. FFBCHs 730 start from 'the DRU #0+the size of the BRCHs+the size of the EMBS feedback channel', and HFBCHs 740 are allocated with respective reverse indices starting from the last channel DRU #last of the feedback channel 720. In other words, the positions of the FFBCHs 730 and the positions of the HFBCHs 740 can be changed from each other.

Figure 9:
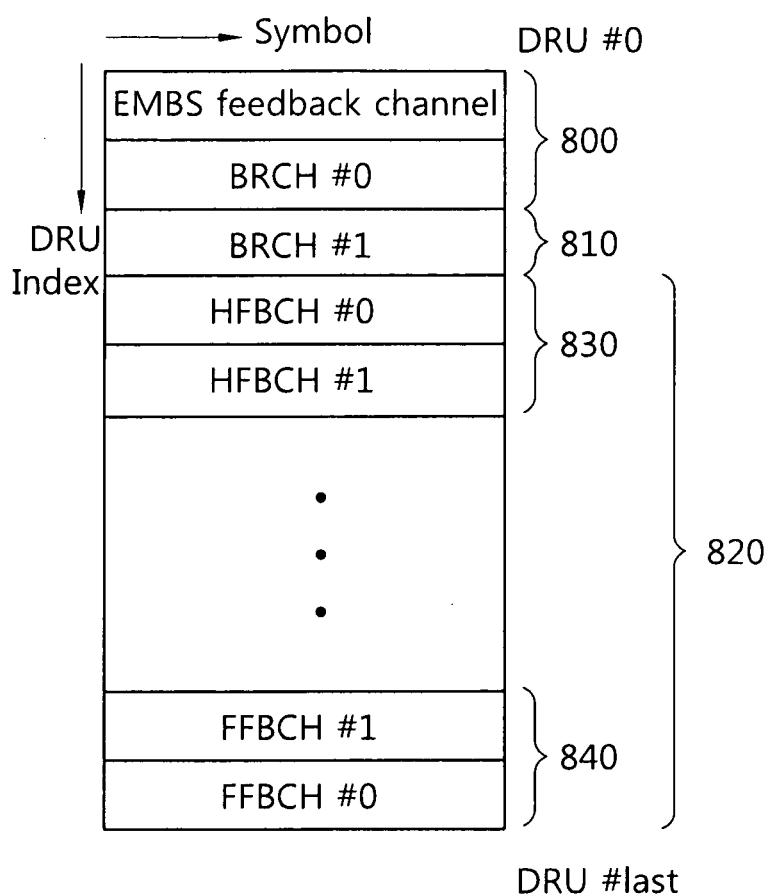
FIG. 9 is a diagram showing another example of uplink control channels allocated according to the present invention.

FIG. 9 is a diagram showing another example of uplink control channels allocated according to the present invention. An EMBS feedback channel 800 starts from a DRU #0, and a BRCH 810 starts from 'the DRU #0+the size of the EMBS feedback channel'. HFBCHs 830 start from 'the DRU #0+the size of the EMBS feedback channel+the size of the BRCHs'. FFBCHs 840 are allocated with respective reverse indices starting from the last channel DRU #last of the feedback channels 820. In other words, the position of the EMBS feedback channel 800 and the positions of the BRCHs 810 can be changed from each other.

Figure 10:
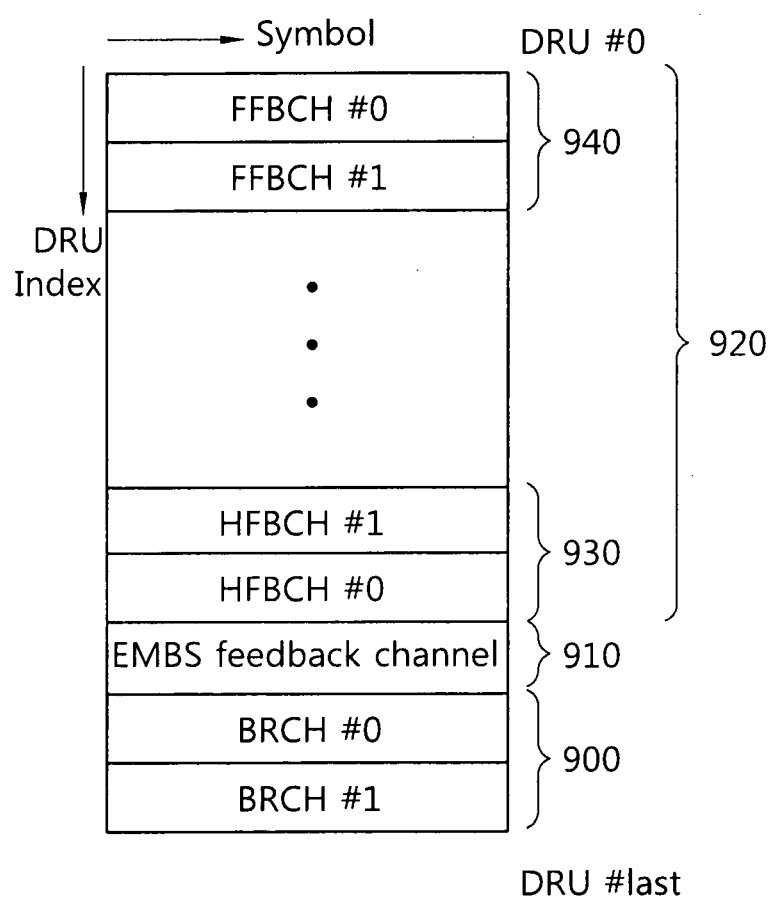
FIG. 10 is a diagram showing another example of uplink control channels allocated according to the present invention.

FIG. 10 is a diagram showing another example of uplink control channels allocated according to the present invention. BRCHs 900 are allocated with respective reverse indices starting from a last channel DRU #last. An EMBS feedback channel 910 starts from 'the DRU #last–the size of the BRCHs'. HFBCHs 930 start from 'the DRU #last–the size of the BRCHs–the size of the EMBS feedback channel', and FFBCHs 940 start from the first channel DRU #0 of the feedback channels 920. In other words, the sequence of the uplink control channels can be changed.

As illustrated in FIGS. 8 to 10, the sequence of the uplink control channels can be changed, and changes in the sequence of the channels can be combined.

In allocating the uplink control channels, although the same DRU number is allocated to cells, the positions of actual physical resources can differ because a DRU number corresponds to a logical concept. However, the same position can be allocated to physical resources between cells in order to avoid Inter-Cell Interference (ICI) between the data channels of neighbor cells because BRCHs and EMBS feedback channels are based on Code Division Multiplexing (CDM).

Meanwhile, in the case in which the number of downlink subframes and the number of uplink subframes within one frame differ from each other, the mapping relationship between a downlink grant and a corresponding HFBCH needs to be previously set in allocating HFBCHs. Such a mapping relationship has to be fixed by the standard document.

Figure 11:
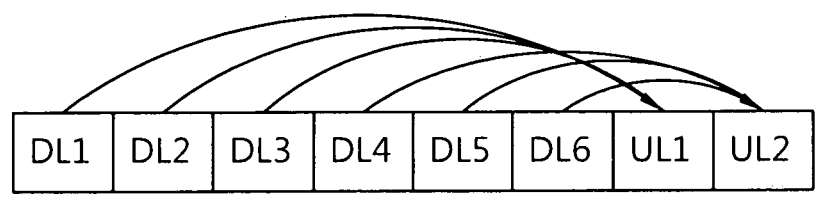
FIG. 11 is a diagram showing an example of the mapping relationship between six downlink subframes and two uplink subframes.

FIG. 11 is a diagram showing an example of the mapping relationship between six downlink subframes and two uplink subframes. Pieces of HARQ feedback information about the downlink grants of first to third downlink subframes DL1 to DL3 are sequentially allocated to HFBCHs placed in a first uplink subframe UL1. Pieces of HARQ feedback information about the downlink grants of fourth to sixth downlink subframes DL4 to DL6 are sequentially allocated to HFBCHs placed in a second uplink subframe UL2.

Figure 12:
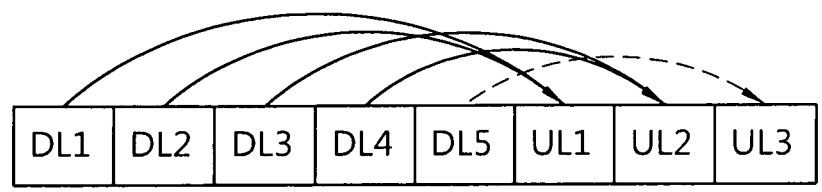
FIG. 12 is a diagram showing an example of the mapping relationship between five downlink subframes and three uplink subframes.

FIG. 12 is a diagram showing an example of the mapping relationship between five downlink subframes and three uplink subframes. Pieces of HARQ feedback information about the downlink grants of first and second downlink subframes DL1 and DL2 are sequentially allocated to HFBCHs placed in a first uplink subframe UL1. Pieces of HARQ feedback information about the downlink grants of third and fourth downlink subframes DL3 and DL4 are sequentially allocated to HFBCHs placed in a second uplink subframe UL2. Further, HARQ feedback information about the downlink grants of fifth downlink subframes DL5 is sequentially allocated to HFBCHs placed in a third uplink subframe UL3.

Figure 13:
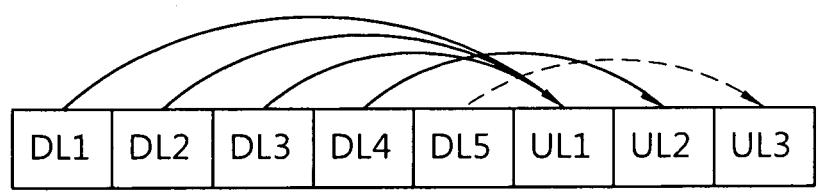
FIG. 13 is a diagram showing another example of the mapping relationship between five downlink subframes and three uplink subframes.

FIG. 13 is a diagram showing another example of the mapping relationship between five downlink subframes and three uplink subframes. Pieces of HARQ feedback information about the downlink grants of first to third downlink subframes DL1 to DL3 are sequentially allocated to HFBCHs placed in a first uplink subframe UL1. HARQ feedback information about the downlink grant of a fourth downlink subframe DL4 is allocated to an HFBCH placed in a second uplink subframe UL2. Further, HARQ feedback information about the downlink grant of a fifth downlink subframe DL5 is allocated to an HFBCH placed in a third uplink subframe UL3.

Figure 14:
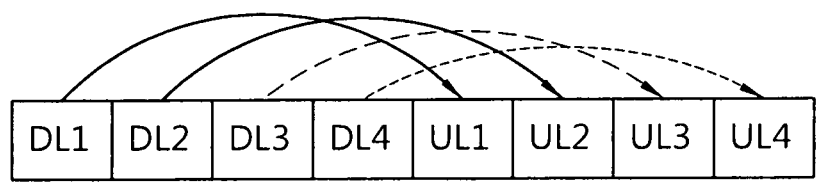
FIG. 14 is a diagram showing an example of the mapping relationship between four downlink subframes and four uplink subframes.

FIG. 14 is a diagram showing an example of the mapping relationship between four downlink subframes and four uplink subframes. The number of downlink subframes is identical with the number of uplink subframes. Accordingly, HARQ feedback information about the downlink grant of each of the downlink subframes DLs is allocated to an HFBCH placed in an uplink subframe UL having the same number as the downlink subframe.

Figure 15:
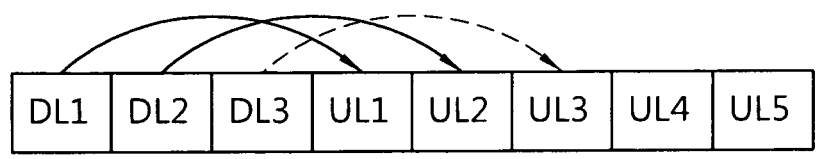
FIG. 15 is a diagram showing an example of the mapping relationship between three downlink subframes and five uplink subframes.

FIG. 15 is a diagram showing an example of the mapping relationship between three downlink subframes and five uplink subframes. HARQ feedback information about the downlink grant of each of the downlink subframes DLs is allocated to an HFBCH placed in an uplink subframe UL having the same number as the downlink subframe. Accordingly, a fourth or fifth uplink subframe is not allocated for HARQ feedback information.

Figure 16:
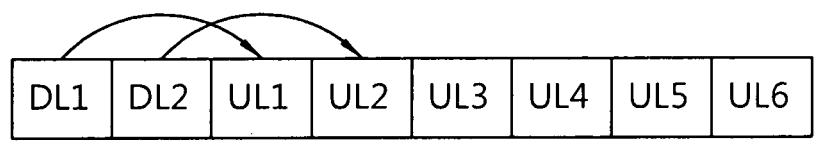
FIG. 16 is a diagram showing an example of the mapping relationship between two downlink subframes and six uplink subframes.

FIG. 16 is a diagram showing an example of the mapping relationship between two downlink subframes and six uplink subframes. HARQ feedback information about the downlink grant of each of the downlink subframes DLs is allocated to an HFBCH placed in an uplink subframe UL having the same number as the downlink subframe. Accordingly, third to sixth uplink subframes UL3 to UL6 are not allocated for HARQ feedback information. In this case, time latency between the HFBCHs corresponding to respective uplink grants is one subframe.

Figure 17:
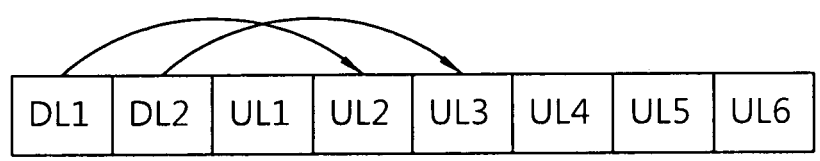
FIG. 17 is a diagram showing another example of the mapping relationship between two downlink subframes and six uplink subframes.

FIG. 17 is a diagram showing an example of the mapping relationship between two downlink subframes and six uplink subframes. HARQ feedback information about the downlink grant of a first downlink subframe DL1 is allocated to an HFBCH placed in a second uplink subframe UL2, and HARQ feedback information about the downlink grant of a second downlink subframe DL2 is allocated to an HFBCH placed in a third uplink subframe UL3. First and fourth to sixth uplink subframes UL1 and UL4 to UL6 are not allocated for HARQ feedback information. In this case, time latency between the HFBCHs corresponding to the respective uplink grants is two subframes.

According to the present invention, a plurality of uplink control channels is configured so that the uplink control channels are neighbor each other within a resource region, and control signals are transmitted on the uplink control channels. Accordingly, information about the size of uplink control channels, which is necessary to configure the uplink control channels, is transmitted to a minimum extent, and so signaling overhead can be reduced.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting an uplink control signal, by a user equipment, in a wireless communication system, the method comprising:
   receiving pieces of resource allocation information on a plurality of uplink control channels from a base station, the plurality of uplink control channels comprising a feedback channel and a bandwidth request channel;
   allocating a feedback region of a frequency partition to the feedback channel and a bandwidth request region of the frequency partition to the bandwidth request channel based on the resource allocation information;
   allocating a data region of the frequency partition to a data channel; and
   transmitting the uplink control signal to the base station through at least one of the plurality of uplink control channels,
   wherein the resource allocation information includes a frequency partition location for the plurality of uplink control channels,
   wherein the resource allocation information further includes a size of the feedback region,
   wherein an allocation order of the plurality of uplink control channels and the data channel are the feedback channel, the bandwidth request channel and the data channel,
   wherein an index of a logical resource unit allocated to the feedback channel is less than an index of a logical resource unit allocated to the bandwidth request channel, and
   wherein an index of a logical resource unit allocated to the bandwidth request channel is less than an index of a logical resource unit allocated to the data channel.

2. The method of claim 1, wherein the frequency partition where the plurality of uplink control channels are located is either a reuse 1 partition or a high-power reuse 3 partition.

3. The method of claim 1, wherein the resource allocation information is broadcast.

4. The method of claim 1, wherein the feedback channel comprises a fast feedback channel (FFBCH) for transmitting a channel quality indicator (CQI) or multiple-input multiple-output (MIMO) information and a hybrid automatic repeat request (HARQ) feedback channel (HFBCH) for transmitting an HARQ acknowledgement/non-acknowledgement (ACK/NACK).

5. The method of claim 4, wherein an allocation order of the feedback channel is the HFBCH and the FFBCH.

6. The method of claim 5, wherein an index of a logical resource unit allocated to the HFBCH is less than an index of a logical resource unit allocated to the FFBCH.

7. The method of claim 1, wherein the size of the feedback region indicates a number of logical resource units in the feedback region.

8. The method of claim 1, wherein the size of the feedback region comprises a number of HFBCHs.

9. The method of claim 1, wherein the resource allocation information further includes a position where the bandwidth request channel is allocated.

10. The method of claim 1, further comprising:
transmitting uplink data through to the base station through the data channel.

11. A user equipment for transmitting an uplink control signal in a wireless communication system, the user equipment comprising:
a radio frequency (RF) unit for transmitting or receiving an radio signal; and
a processor operatively coupled to the RF unit, and configured for:
receiving pieces of resource allocation information on a plurality of uplink control channels from a base station, the plurality of uplink control channels comprising a feedback channel and a bandwidth request channel;
allocating a feedback region of a frequency partition to the feedback channel and a bandwidth request region of a frequency partition to the bandwidth request channel based on the resource allocation information;
allocating a data region of the frequency partition to a data channel; and
transmitting the uplink control signal to the base station through at least one of the plurality of uplink control channels,
wherein the resource allocation information includes a frequency partition location for the plurality of uplink control channels,
wherein the resource allocation information further includes a size of the feedback region,
wherein an allocation order of the plurality of uplink control channels and the data channel are the feedback channel, the bandwidth request channel, and the data channel,
wherein an index of a logical resource unit allocated to the feedback channel is less than an index of a logical resource unit allocated to the bandwidth request channel, and
wherein an index of a logical resource unit allocated to the bandwidth request channel being less than an index of a logical resource unit allocated to the data channel.

12. The user equipment of claim 11, wherein the frequency partition where the plurality of uplink control channels are located is either a reuse 1 partition or a high-power reuse 3 partition.

13. The user equipment of claim 11, wherein the resource allocation information is broadcast.

14. The user equipment of claim 11, wherein the feedback channel comprises a fast feedback channel (FFBCH) for transmitting a channel quality indicator (CQI) or multiple-input multiple-output (MIMO) information and a hybrid automatic repeat request (HARQ) feedback channel (HFBCH) for transmitting an HARQ acknowledgement/non-acknowledgement (ACK/NACK).

15. The user equipment of claim 14, wherein an allocation order of the feedback channel is the HFBCH and the FFBCH.

16. The user equipment of claim 15, wherein an index of a logical resource unit allocated to the HFBCH is less than an index of a logical resource unit allocated to the FFBCH.

17. The user equipment of claim 11, wherein the size of the feedback region indicates a number of logical resource units in the feedback region.

18. The user equipment of claim 11, wherein the size of the feedback region comprises a number of HFBCHs.

* * * * *